United States Patent [19]

Sedlatschek

[11] 4,135,461
[45] Jan. 23, 1979

[54] STITCH PATTERN SELECTION AND DISPLAY ARRANGEMENT FOR SEWING MACHINES

[75] Inventor: Robert Sedlatschek, Bridgewater, N.J.

[73] Assignee: The Singer Company, New York, N.Y.

[21] Appl. No.: 861,470

[22] Filed: Dec. 16, 1977

[51] Int. Cl.$^2$ ............................................. D05B 3/02
[52] U.S. Cl. .............................. 112/158 E; 112/158 F
[58] Field of Search ........... 112/158 E, 158 F, 158 A, 112/158 R; 334/29

[56] References Cited

U.S. PATENT DOCUMENTS

| | | | |
|---|---|---|---|
| 3,006,297 | 10/1961 | Urscheler | 112/158 A |
| 3,070,050 | 12/1962 | Höll et al. | 112/158 F |
| 3,177,432 | 4/1965 | Kelln | 334/29 X |

*Primary Examiner*—Peter Nerbun
*Attorney, Agent, or Firm*—David L. Davis; Robert E. Smith; Edward L. Bell

[57] ABSTRACT

A sewing machine is disclosed wherein a plurality of stitch patterns encoded as digital data are stored in a static memory. A graphic pattern display element having pattern images corresponding to the plurality of stitch patterns is mounted on a cylindrical member. The cylindrical member is mounted on the output shaft of a stepping motor. Rotation of the stepping motor causes the pattern images to travel past a display window through which they may be viewed by a machine operator. Control elements are provided for the machine operator to cause the stepping motor to be rotated until a desired stitch pattern image is visible in a predetermined position through the display window. A stepping motor shaft position sensor is coupled to provide signals indicative of the angular position of the stepping motor shaft, which angular position corresponds to the pattern visible in the predetermined position. These signals are utilized to access the memory to retrieve therefrom the digital data corresponding to the desired stitch pattern.

6 Claims, 5 Drawing Figures

STITCH PATTERN SELECTION AND DISPLAY ARRANGEMENT FOR SEWING MACHINES

BACKGROUND OF THE INVENTION

This invention relates to sewing machines and, more particularly, to a stitch pattern selection and display arrangement for use in a sewing machine having switch pattern data stored in an addressable memory.

In recent years, so called "electronic" home sewing machines have gained in popularity and have met with commercial success. These electronic sewing machines typically include a static memory unit for storing in digital form information to control both the needle positioning mechanism and the work feeding mechanism to automatically produce a desired pattern. Signals generated from the stored information are applied to signal responsive actuators for selectively positioning the needle and the work feeding mechanism. A sewing machine of this type is fully described in U.S. Pat. No. 3,872,808, assigned to the assignee herein, and the disclosure of this patent is hereby incorporated by reference.

In a sewing machine of the type disclosed in the above-referenced patent, approximately two dozen patterns are available for operator selection. If a separate push button were to be provided for the selection of each pattern with the proper spacing between buttons so that an operator could only push a single button, at least all of the available space on the front and top surfaces of the sewing machine would have to be utilized. Arrangements for conserving such surface space and providing for selection of the great multiplicity of patterns have been successfully engineered. For example, U.S. Pat. No. 3,913,506 discloses a pattern selection system for sewing machines wherein in addition to a limited number of primary pattern selection elements, secondary selector means are provided by which the operator may render any one of a number of different sets or groups of stitch patterns subject to selection by the primary selection elements. This selection arrangement requires the operator to visually scan all of the available patterns and to operate two spaced apart actuators in order to select the desired pattern.

It is therefore an object of this invention to provide a stitch pattern selection and display arrangement for a sewing machine which utilizes a minimum of space on the sewing machine surface.

It is a further object of this invention to provide such an arrangement wherein stitch pattern selection and display is accomplished with a minimum of operator influenced actuator elements.

SUMMARY OF THE INVENTION

The foregoing and additional objects of this invention are attained by providing a stitch pattern selection and display arrangement for use in a sewing machine including memory means for storing selectively retrievable stitch pattern information to control bight and feed so as to form a selected stitch pattern, the arrangement comprising a graphic pattern display element having a plurality of substantially equal size stitch pattern image areas thereon, a display window of sufficient dimension to permit at least one of the image areas to be viewed therethrough, a stepping motor including a shaft, means for mounting the display element on the stepping motor shaft, operator influenced stepping motor control means for controlling the stepping motor to rotate the shaft so that an operator desired one of the pattern image areas is visible in a predetermined position through the window, means for sensing the angular position of the stepping motor shaft and providing an output signal indicative of the position, and means responsive to the output signal for retrieving from the memory means stored bight and feed information to form the pattern corresponding to the pattern image area visible in the predetermined position.

BRIEF DESCRIPTION OF THE DRAWING

The foregoing will be more readily apparent upon reading the following description in conjunction with the drawing in which.

DESCRIPTION OF THE PREFERRED EMBODIMENT

Figure 1:
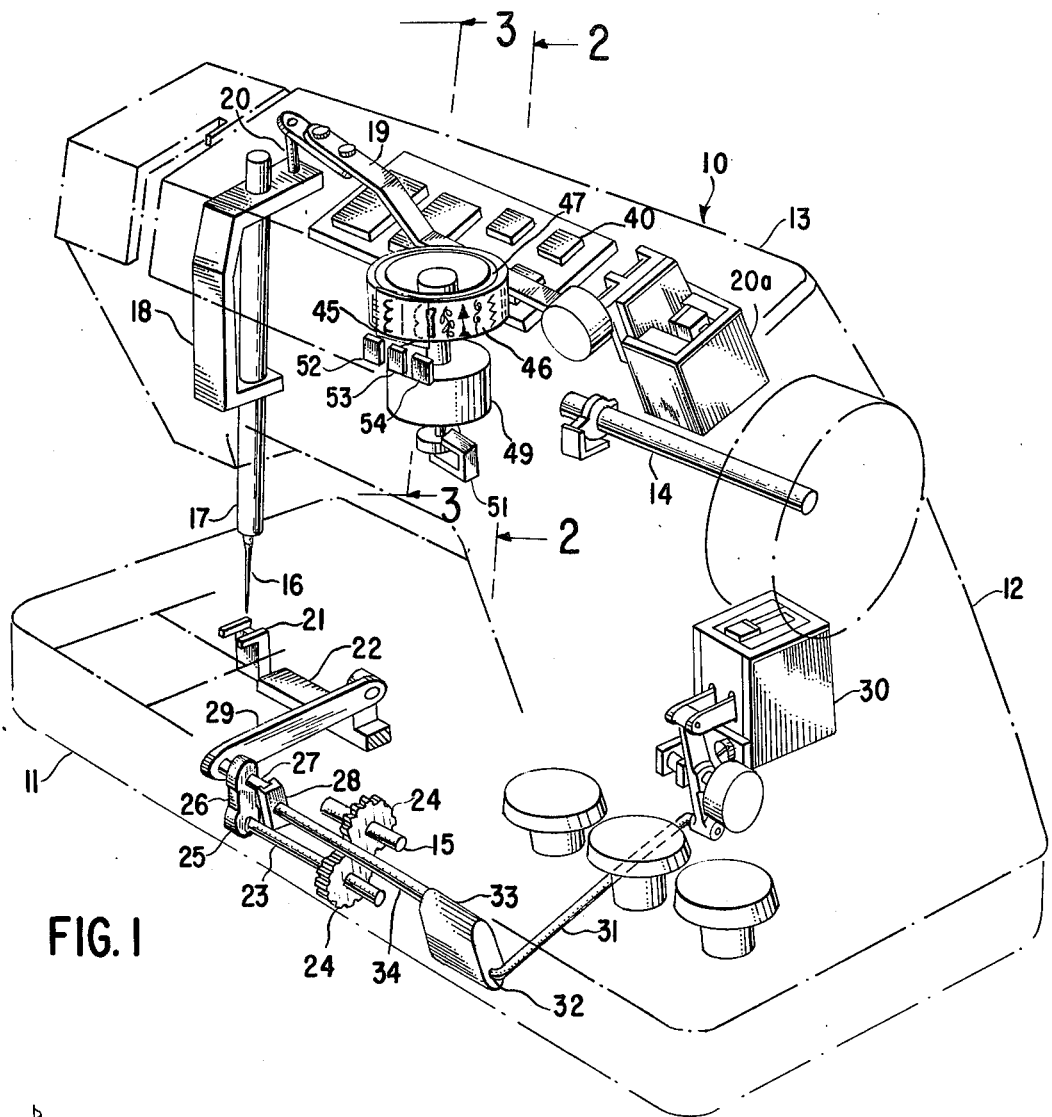
FIG. 1 is a perspective view of a sewing machine having the pattern selection and display arrangement of this invention incorporated therein.

FIG. 1 of the drawing illustrates a sewing machine with fragments of two mechanisms shown thereon, the needle positioning and the work feeding mechanism, which can contribute to changes in the relative coordinates of successive needle penetrations. As shown in phantom lines in FIG. 1, the sewing machine casing 10 includes a bed 11, a standard 12 rising from the bed 11 and a bracket arm 13 overhanging the bed 11. The driving mechanism of the sewing machine includes an arm shaft 14 and a bed shaft 15 interconnected by a timing belt (not shown) in the standard 12, the timing belt being driven by the main drive motor (also not shown) of the sewing machine. A needle 16 carried for endwise reciprocation by a needle bar 17 is mounted for lateral jogging movement in a gate 18 in the bracket arm 13. Any conventional connections (not shown) may be used between the arm shaft 14 and the needle bar 17 for imparting needle reciprocation. A drive link 19 pivoted at 20 to the gate 18 serves to impart lateral jogging movement to the needle 16. The drive link 19 is connected to a linear actuator 20a which controls the position of the link 19 and hence the lateral position of the needle 16.

Also illustrated in FIG. 1 is a fragment of a work feeding mechanism including a feed dog 21 carried by a feed bar 22. In FIG. 1 a mechanism is illustrated for imparting work transporting movement to the feed dog 21 including a feed drive shaft 23 driven by gears 24 from the bed shaft 15, a cam 25 on the feed drive shaft 23, a pitman 26 embracing the cam 25 and connected to reciprocate a slide block 27 in a slotted feed regulating guideway 28. A link 29 pivotally connects the pitman 26 with the feed bar 22 so that depending upon the inclination of the guideway 28, the magnitude and direction of the feed stroke of the feed dog 21 will be determined. The inclination of the guideway 28 is controlled by a linear actuator 30, connected to a link 31. The link 31 is pivoted at 32 to a rock arm 33 carried on a rock shaft 34 secured to the guideway 28. Movement of the linear actuator 30 controls the position of the link 31 and the inclination of the guideway 27.

Also shown in FIG. 1 is a printed circuit board 40 which illustratively has mounted thereon memory means for storing stitch pattern information and control circuitry for operating the linear actuators 20a 30 in accordance with the stored information. The circuitry on the board 40 will not be described in any greater detail than is necessary for an understanding of the principles of this invention and such explanation will be given in conjunction with a description of the block diagram of FIG. 5. If additional information is desired, the reader is referred to the above-referenced U.S. Pat. No. 3,872,808.

In accordance with the principles of this invention, a transparent display window 45 is provided in the front face of the sewing machine arm 13. Behind the window 45 and within the arm 13 is a graphic pattern display element 46 mounted on a cylindrical member 47. The cylindrical member 47 is mounted on the shaft 48 of a stepping motor 49 in a conventional manner and is adapted to be rotated therewith. The stepping motor 49 is conventionally mounted (by means not shown) within the arm 13. Suspended within the cylindrical member 47 is a source of light, illustratively a miniature incandescent lamp 50. A shaft position sensor and encoder 51 is coupled to the shaft 48.

The cylindrical element 47 is transparent to allow light from the light source 50 to pass therethrough. The display element 46 is a transparent graphic pattern display having a plurality of substantially equal size stitch pattern image areas thereon. Each of the image areas is a graphical representation of one of the patterns which may be formed by utilizing the information stored within the memory means on the circuit board 40. Illustratively, there are 24 patterns which may be produced in accordance with the information stored in the memory means. Therefore, the display element 46 has 24 image areas, each occupying 15° out of the total 360° of circumference of the cylindrical member 47. Accordingly, the stepping motor 49 is chosen to be a 15° per step stepping motor, preferably of the permanent magnet type which is of low cost. Besides being of low cost, another advantage of utilizing a permanent magnet stepping motor is that it maintains its position when power is reduced or removed.

Figure 4:
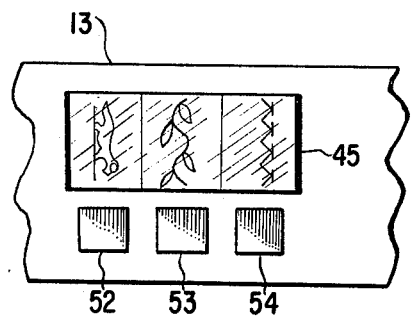
FIG. 4 is an enlarged front elevational view of the pattern selection and display window and actuators according to this invention.

As shown in FIG. 4, the display window 45 is chosen to be of sufficient dimension that three of the image areas on the display element 46 are visible therethrough.

In accordance with the principles of this invention, three operator controllable actuators 52, 53 and 54 are provided. Illustratively, these actuators are push button switches. A preferred method of operating the sewing machine 10 in order to select a desired pattern is for the operator to push the actuator 53. This causes, in a manner to be described in detail hereinafter, the stepping motor 49 to advance the cylindrical member 47 three steps so that three different image ares are visible through the display window 45. The operator continues pushing the actuator 53 until the desired pattern is visible. If the desired pattern is the center pattern of the three visible patterns, no further action is required by the operator. If the desired pattern is the leftmost visible pattern, the operator pushes the actuator 52. This causes the stepping motor 49 to move one step in the "left" direction so that the prior leftmost pattern becomes the center pattern viewed through the display window 45. Likewise, if the desired pattern is the rightmost pattern of the three patterns which are visible through the display window 45, the operator then pushes the right actuator 54 to cause the stepping motor 49 to move in the "right" direction to center the prior rightmost pattern. The angular position of the stepping motor shaft 48, as sensed by the shaft position sensor 51, is designed to correspond to the center pattern which is visible through the display window 45.

Figure 2:
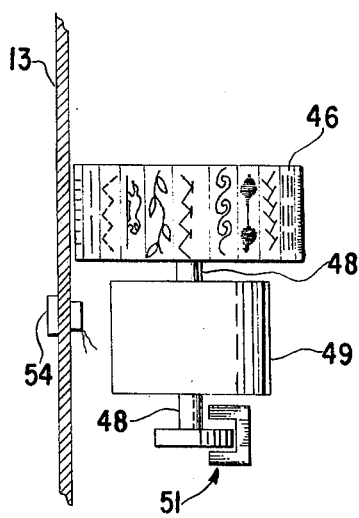
FIG. 2 is a sectional view taken along the line 2—2 of FIG. 1.
Figure 3:
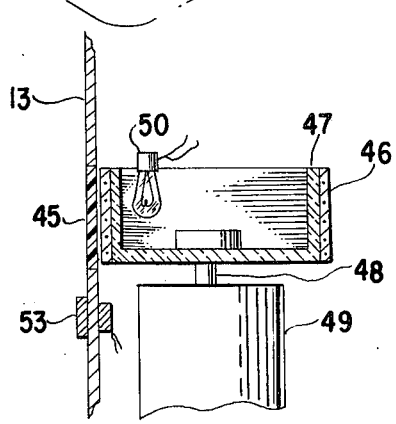
FIG. 3 is sectional view taken along the line 3—3 of FIG. 1.
Figure 5:
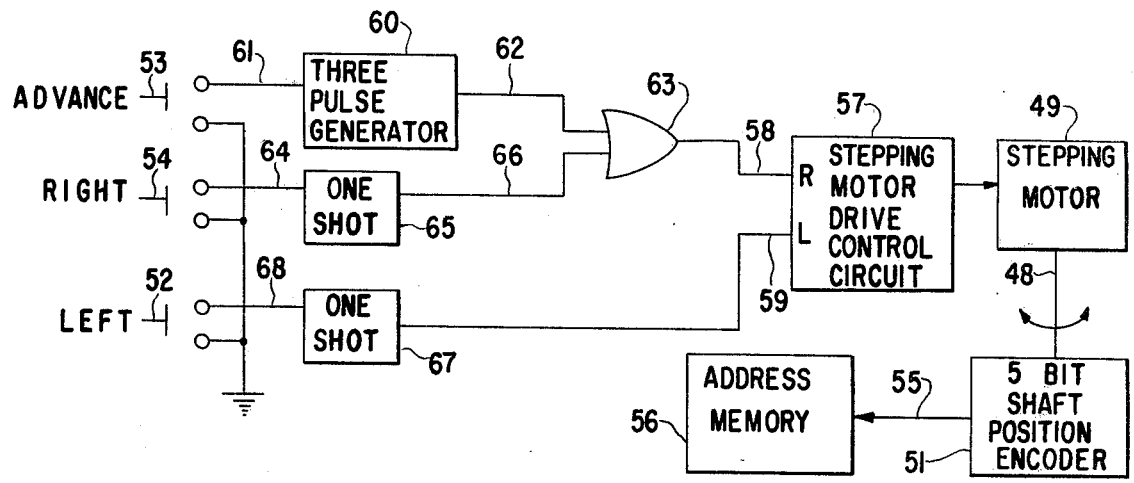
FIG. 5 is a block schematic diagram of illustrative control circuitry for the pattern selection and display arrangement according to this invention.

Referring now to FIG. 5, depicted therein is a block schematic diagram of illustrative control circuitry for the pattern selection and display arrangement according to this invention. As shown in FIG. 5, the shaft 48 of the stepping motor 49 is coupled to the shaft position encoder 51. The encoder 51 is of conventional design and provides over the output leads 55 a five bit digital code indicative of the angular position of the shaft 48. There are 24 angular positions which the shaft 48 can assume, each of these positions corresponding to one of the sewing machine stitch patterns. The five bit code over the leads 55 is an input to the address memory circuit 56. The address memory circuit 56 corresponds to the address memory 91 shown in FIG. 2 of the above-referenced U.S. Pat. No. 3,872,808. As disclosed in that patent, the output of the address memory 56 is a code word representing the pattern selected, the bight and feed information for forming the pattern then being retrieved from the memory unit. Thus, the angular position of the shaft 48 is sensed to uniquely determine the selected pattern.

In order to control the stepping motor 49 to display, and hence select, the desired pattern, a stepping motor drive control circuit 57 is provided. The stepping motor drive control circuit 57 is of conventional design and responds to pulses on its "right" input lead 58 to cause the stepping motor 49 to rotate in a first direction and it also responds to pulses on its "left" input lead 59 to cause the stepping motor 49 to rotate in a second direction. For each pulse over one of the input leads 58 and 59, the stepping motor 49 is caused to move a single, illustratively 15°, step in the respective direction. To provide input signals to the stepping motor drive control circuit 57, the push button 53, designated the ADVANCE button, is connected to provide a ground signal to a three pulse generator 60 when pushed. The three pulse generator 60 is of conventional design and responds to a ground level signal on its input lead 61 to provide three pulses on its output lead 62. The lead 62 is coupled to one input of OR gate 63 whose output is the lead 58. Therefore, when the ADVANCE button 53 is pushed, three pulses appear at the "right" input to the stepping motor drive control circuit 57 so as to cause the stepping motor 49 to advance three steps. This occurs each time the ADVANCE button 53 is pushed so that an operator can quickly scan all the possible pattern images, in groups of three, until a desired pattern image is visible through the display window 45. At this time, if the desired pattern image is in the center, no further action is necessary on the part of the operator, other than to begin sewing, because the five bit shaft position encoder 51 provides signals to address memory circuit 56 indicative of the centermost pattern, which is the desired one. However, if the desired pattern is on the right side of the display window 45, the operator pushes the RIGHT button 54 which applies a ground signal to the lead 64. This ground signal on the lead 64 is an input to one-shot circuit 65, of conventional design, which applies a single pulse to the lead 66. The lead 66 is an input to the OR gate 63. Thus, when the RIGHT button 54 is pushed, a single pulse appears at the "right" input 58 of the stepping motor drive control circuitry 57 to cause the stepping motor 49 to advance one step bringing the prior rightmost pattern image within the display window 45 to the center position thereof. This causes the output of the five bit shaft position encoder 51 to change and provide the proper new pattern information signals to the address memory circuit 56. Similarly, if the desired pattern image is in the leftmost position of the display window 45, the operator pushes the LEFT button 52 to apply a ground signal to one-shot circuit 67 over the lead 68. The one-shot circuit 67 responds to provide a signal pulse to the "left" input of the stepping motor drive control circuit 57 over the lead 59. This causes the stepping motor 49 to move one step in the second direction so as to bring the prior leftmost pattern image into the center position of the display window 45. Again, this changes the pattern information transmitted to the address memory circuit 56 by the five bit shaft position encoder 51.

Accordingly, there has been described a stitch pattern selection and display arrangement for use in a sewing machine having stitch pattern data stored in an addressable memory. It is understood that the above-described arrangement is merely illustrative of the application of the principles of this invention. For example, the display window could only have room to display a single pattern image, in which case only a single actuator would be provided and the stepping motor would only be advanced a single step at a time. Also, the centermost position is only one possible position for the desired pattern image, it being contemplated that other positions within the window may be chosen while still remaining within the scope of this invention. For instance, the leftmost position may be chosen as the position for the desired pattern image, in which case only an ADVANCE button and a RIGHT button would be necessary. Alternatively, the display arrangement could react to pattern selection from an external source to control the stepping motor so as to display the selected pattern through the window. Numerous other arrangements may be devised by those skilled in the art without departing from the spirit and scope of this invention, as defined by the appended claims.

Having thus set forth the nature of the invention, what is claimed herein is:

1. A stitch pattern selection and display arrangement for use in a sewing machine including memory means for storing selectively retrievable stitch pattern information, said arrangement comprising:
   a graphic pattern display element having a plurality of substantially equal size stitch pattern image areas thereon;
   a display window of sufficient dimension to permit at least one of said image areas to be viewed therethrough;
   a stepping motor including a shaft;
   means for mounting said display element on said stepping motor shaft;
   operator influenced stepping motor control means for controlling said stepping motor to rotate said shaft so that an operator desired one of said pattern image areas is visible in a predetermined position through said window;
   means for sensing the angular position of said stepping motor shaft and providing an output signal indicative of said position; and
   means responsive to said output signal for retrieving from said memory means stored information to form the pattern corresponding to the pattern image area visible in said predetermined position.

2. The arrangement according to claim 1 wherein said mounting means comprises a cylindrical member mounted coaxially on said stepping motor shaft and said graphic pattern display element is mounted on the outside of said cylindrical member.

3. The arrangement according to claim 2 wherein said cylindrical member is transparent, said stitch pattern image areas of said graphic pattern display element are transparencies graphically portraying said stitch patterns and said arrangement further includes a source of light inside said cylindrical member.

4. The arrangement according to claim 1 wherein said control means includes:
   first means responsive to operator actuation thereof for providing a first signal; and
   means responsive to said first signal for controlling said stepping motor to move in a first direction a number of steps equal to the number of image areas visible through said display window.

5. The arrangement according to claim 4 wherein at least three image areas are visible through said display window and said control means further includes:
   second means responsive to operator actuation thereof for providing a second signal;
   means responsive to said second signal for controlling said stepping motor to move one step in said first direction;
   third means responsive to operator actuation thereof for providing a third signal; and
   means responsive to said third signal for controlling said stepping motor to move one step in a second direction opposite said first direction.

6. The arrangement according to claim 1 wherein said stitch pattern information is stored in said memory means in locations uniquely identifiable by digital address codes and said sensing means includes a digital output shaft position encoder which provides to said retrieving means the digital address code corresponding to the stitch pattern whose image area is visible in said predetermined position through said window.

* * * * *